US011748304B1

United States Patent
Wang et al.

(10) Patent No.: US 11,748,304 B1
(45) Date of Patent: Sep. 5, 2023

(54) INSERT PERFORMANCE IMPROVEMENT

(71) Applicant: INTERNATIONAL BUSINESS MACHINES CORPORATION, Armonk, NY (US)

(72) Inventors: Xiaobo Wang, Beijing (CN); Shuo Li, Beijing (CN); Sheng Yan Sun, Beijing (CN); Jie Ling, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/659,668

(22) Filed: Apr. 19, 2022

(51) Int. Cl.
*G06F 16/00* (2019.01)
*G06F 16/13* (2019.01)
*G06F 16/27* (2019.01)
G06F 17/18 (2006.01)
G06F 18/26 (2023.01)
G06F 16/2458 (2019.01)

(52) U.S. Cl.
CPC .......... *G06F 16/134* (2019.01); *G06F 16/278* (2019.01); *G06F 16/2458* (2019.01); *G06F 17/18* (2013.01); *G06F 18/26* (2023.01)

(58) Field of Classification Search
CPC .. G06F 16/134; G06F 16/278; G06F 16/2458; G06F 17/18; G06F 18/26
See application file for complete search history.

(56) References Cited

U.S. PATENT DOCUMENTS

| | | | |
|---|---|---|---|
| 8,086,579 B1* | 12/2011 | Chandrasekaran | G06F 16/2343 707/703 |
| 8,682,872 B2 | 3/2014 | Bright | |
| 10,664,460 B2 | 5/2020 | Fang | |
| 11,023,453 B2 | 6/2021 | Kimura | |
| 11,563,803 B1* | 1/2023 | Idreos | H04L 67/1097 |
| 2008/0065672 A1* | 3/2008 | Bamford | G06F 16/2246 707/999.102 |
| 2012/0016881 A1* | 1/2012 | Hrle | G06F 16/22 707/746 |
| 2012/0054159 A1* | 3/2012 | Xu | G06F 16/2308 707/696 |
| 2017/0116246 A1* | 4/2017 | Fang | G06F 16/2272 |

(Continued)

OTHER PUBLICATIONS

Kraska, T., Beutel, A., Chi, E. H., Dean, J., & Polyzotis, N. (May 2018). The case for learned index structures. In Proceedings of the 2018 international conference on management of data (pp. 489-504). (Year: 2018).*

(Continued)

*Primary Examiner* — Diedra McQuitery
(74) *Attorney, Agent, or Firm* — L. Jeffrey Kelly

(57) ABSTRACT

The method of this disclosure includes identifying a hot area in an index tree where an index split of the index tree has occurred due to a previous data insertion into a database based on historical statistic information on the index split. The method of this disclosure may further include predicting boundary key values of one or more new index pages to be inserted into the index tree for a next data insertion into the database based on a distribution of the hot area in the index tree. The method of this disclosure may further include inserting the one or more new index pages into the index tree based on the predicted boundary key values prior to the next data insertion.

20 Claims, 9 Drawing Sheets

(56) References Cited

U.S. PATENT DOCUMENTS

2021/0216517 A1* 7/2021 Graefe ................ G06F 16/2272
2021/0232557 A1* 7/2021 Zhang .................. G06F 16/282

OTHER PUBLICATIONS

Disclosed Anonymously, "A Method to Improve Performance for Index Operation", https://ip.com/IPCOM/000264515, IPCOM000264515D, Dec. 31, 2020, pp. 1-5.

Mell et al., "The NIST Definition of Cloud Computing", National Institute of Standards and Technology, Special Publication 800-145, Sep. 2011, pp. 1-7.

* cited by examiner

INSERT PERFORMANCE IMPROVEMENT

BACKGROUND

The present disclosure relates to database, and more specifically, to insert performance improvement when inserting data into the database.

A database may be implemented by using an index tree with a tree structure including a plurality of index pages, where each index page corresponds to a node of the tree structure. In a leaf index page, index keys associated with actual data may be stored. In a non-leaf index page, the highest/lowest values of the index keys (also called "index key values") on corresponding leaf index pages may be stored. These index keys in the non-leaf index pages and leaf-pages are associated with actual data and may allow efficient access to desired data in the database.

A new data insertion into the database may trigger an insertion of index key associated with the new data into a leaf index page. If the leaf index page is full of index keys, an index split operation may be triggered to split the leaf index page into two leaf index pages, so that there will be enough space for storing the inserted index key.

SUMMARY

According to one embodiment of the present disclosure, there is provided a computer-implemented method. The method may include identifying a hot area in an index tree where an index split of the index tree has occurred due to a previous data insertion into a database based on historical statistic information on the index split. The method may further include predicting boundary key values of one or more new index pages to be inserted into the index tree for a next data insertion into the database based on a distribution of the hot area in the index tree. The method may further include inserting the one or more new index pages into the index tree based on the predicted boundary key values prior to the next data insertion.

According to another embodiment of the present disclosure, there is provided a system which may include one or more processors and a memory coupled to at least one of the one or more processors. The system may include a set of computer program instructions stored in the memory and executed by at least one of the one or more processors in order to perform an action of identifying a hot area in an index tree where an index split of the index tree has occurred due to a previous data insertion into a database based on historical statistic information on the index split. The system may include a set of computer program instructions stored in the memory and executed by at least one of the one or more processors in order to perform an action of predicting boundary key values of one or more new index pages to be inserted into the index tree for a next data insertion into the database based on a distribution of the hot area in the index tree. The system may include a set of computer program instructions stored in the memory and executed by at least one of the one or more processors in order to perform an action of inserting the one or more new index pages into the index tree based on the predicted boundary key values prior to the next data insertion.

According to a further embodiment of the present disclosure, there is provided a computer program product. The computer program product may include a computer readable storage medium having program instructions embodied within. The program instructions may be executable by a device to perform a method. The method may include identifying a hot area in an index tree where an index split of the index tree has occurred due to a previous data insertion into a database based on historical statistic information on the index split. The method may further include predicting boundary key values of one or more new index pages to be inserted into the index tree for a next data insertion into the database based on a distribution of the hot area in the index tree. The method may further include inserting the one or more new index pages into the index tree based on the predicted boundary key values prior to the next data insertion.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
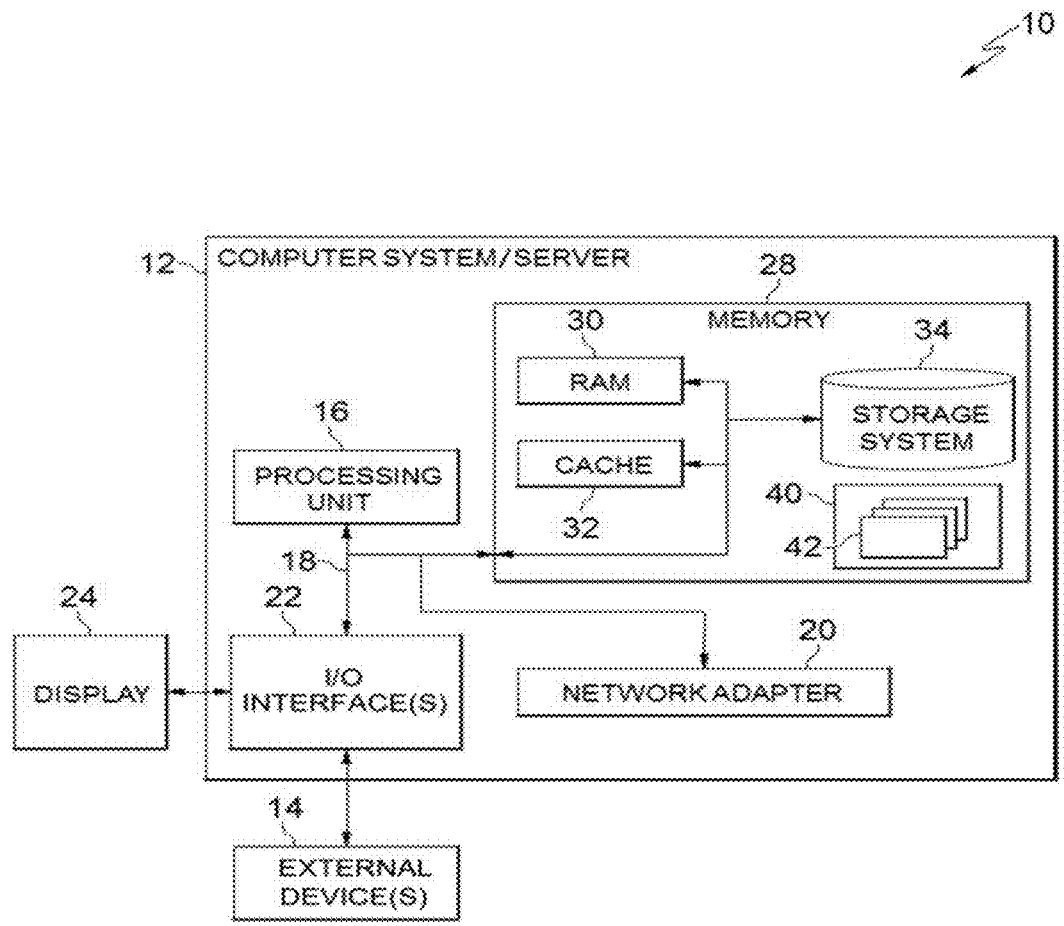
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
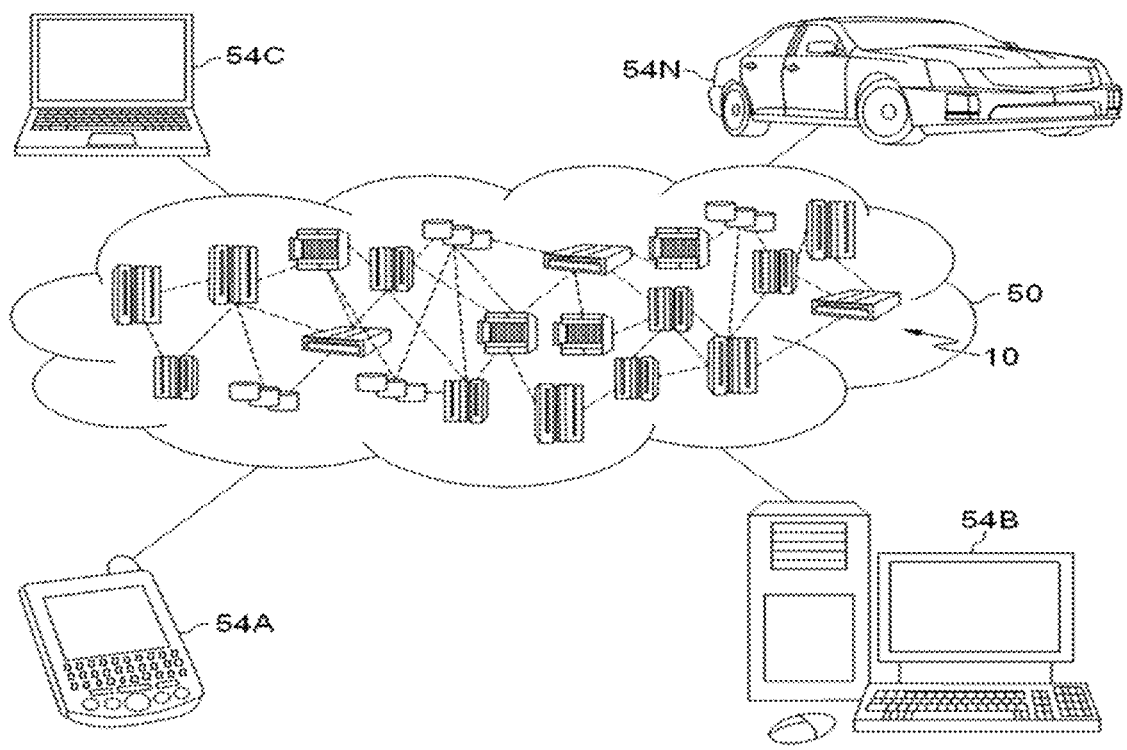
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
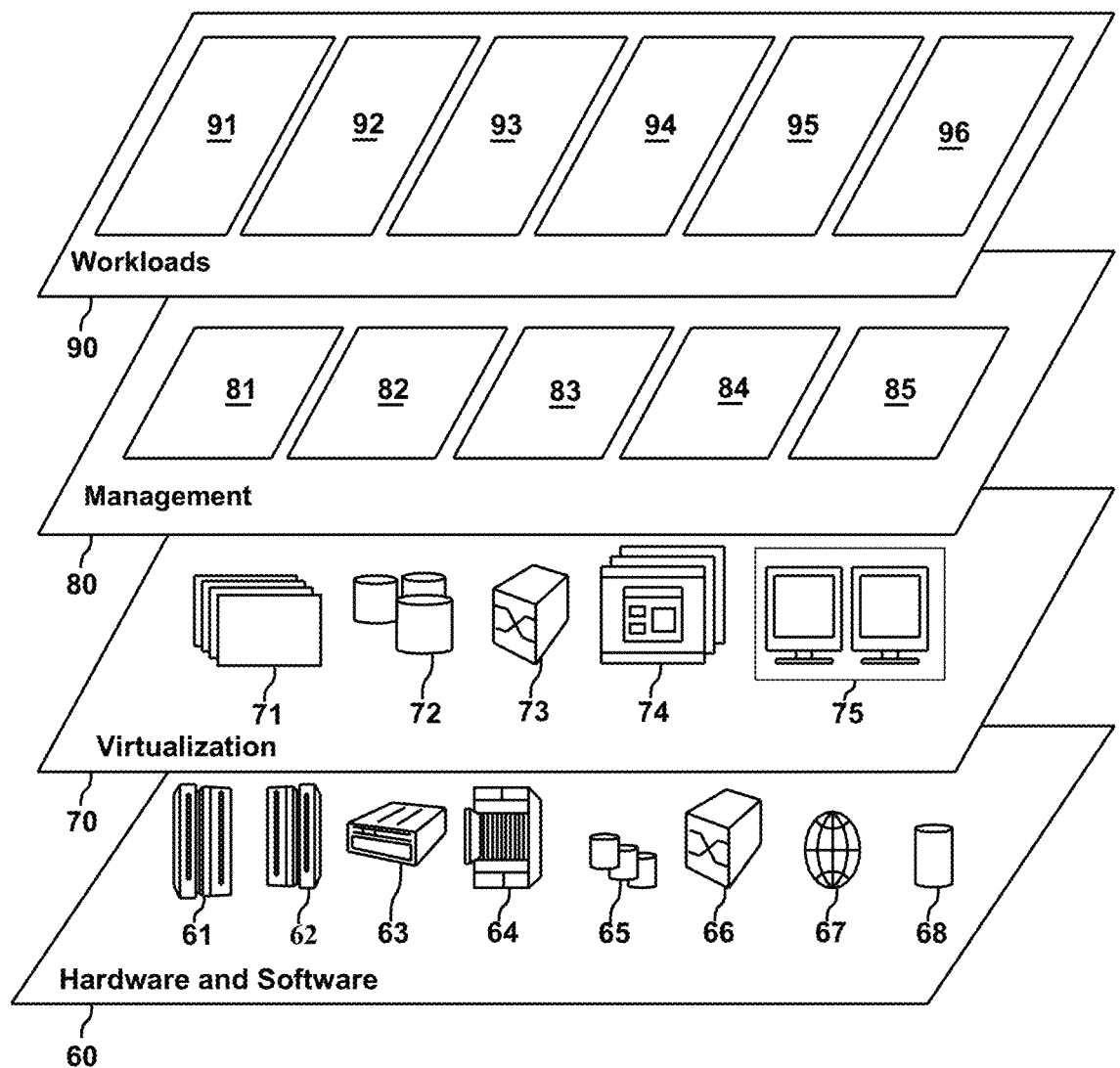
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and insert performance improving 96.

Some embodiments of the present disclosure may be implemented as the program/utility 40 or the program modules 42 of the computer system/server 12 of FIG. 1, or as the insert performance improving 96 of the workloads layer 90 of FIG. 3.

With reference now to FIGS. 4-9, some embodiments of the present disclosure will be described below.

Figure 4A:
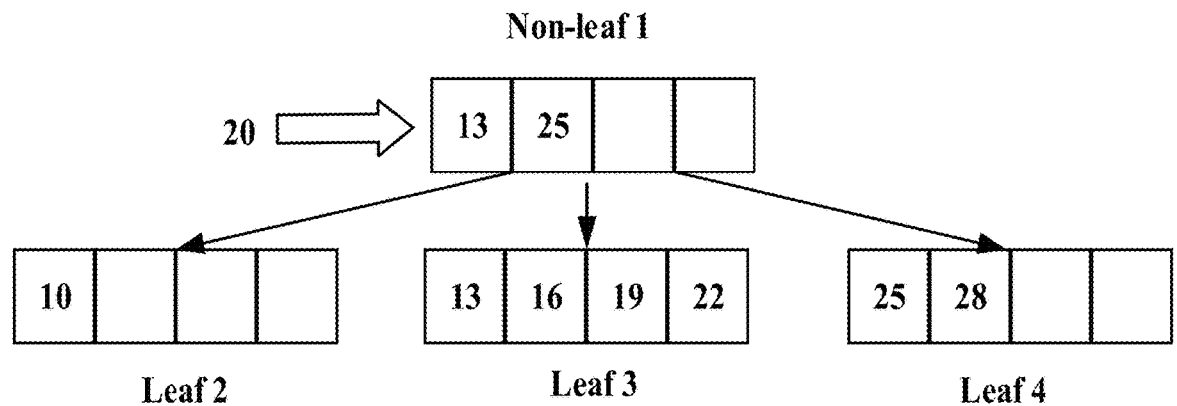
FIGS. 4A and 4B depicts an exemplary index split process in an index tree.
Figure 4B:
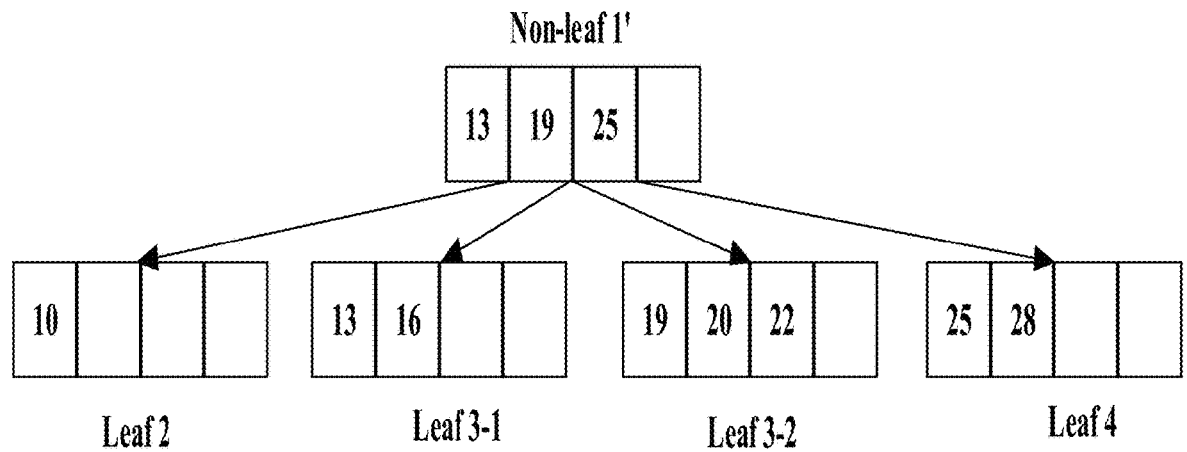

An exemplary index split process in an index tree will be introduced with respect to FIGS. 4A and 4B, wherein FIG. 4A shows an exemplary index tree before the insertion of an index key "20", while FIG. 4B shows the index tree after the insertion of the index key "20". The index key "20" may be associated with a new data to be inserted into the database.

As shown in FIG. 4A, the index tree includes a non-leaf index page 1 and three leaf index pages 2, 3, 4. It should be noted that FIG. 4A may only show a portion of the index tree, and the index tree may include further root index page, non-leaf index pages and/or leaf index pages.

In leaf index pages 2, 3 and 4, index keys "10", "13", "16", "19", "22", "25", and "28" each associated with a piece of actual data are stored in respective leaf index pages. Further, non-leaf index page 1 stores the lowest values of the index keys on corresponding leaf index pages, so that the key value range in each leaf index page may be specified. For example, in non-leaf index page 1, "13" corresponds to the lowest key value "13" on leaf index page 3, and "25" corresponds to the lowest key value "25" on leaf index page 4. Further, the lowest key value on leaf index page 2 may be unlimited, and thus is not necessarily be stored in the non-leaf index page 1.

By referring to the index keys stored on the non-leaf index page, it would be told that the key value range of leaf index page 2 is "key<13", the key value range of leaf index page 3 is "13≤key<25", and the key value range of leaf index page 4 is "key≥25". Similarly, the parent index page of the non-leaf 1 (not shown) may store the lowest values of the index keys on the non-leaf index page 1, so that the key value range of the non-leaf index page 1 may be acknowledged by referring to the corresponding parent index page.

In the present disclosure, the index keys are stored in the index tree in ascending order from left to right. However, it should be noted that the index keys may stored in other order, such as in descending order, according to actual design of the structure of the index tree.

The size of each index page in the index tree may be fixed. For example, leaf index pages can be 4 KB, 8 KB, 16 KB or 32 KB in size, and non-leaf index pages may have the same or different sizes as the leaf index pages, depending on different structure design of the index tree. In FIGS. 4A and 4B, for convenience, it is illustrated that the size of the leaf index pages 2, 3, 4 and the non-leaf index page 1 is four key values, which means one index page may store four index key values.

In FIG. 4A when an index key "20" is to be inserted into the index tree, it is determined, based on the key values stored in the non-leaf index page 1, which leaf index page the index key "20" will be inserted to. Since the index key "20" is within the key value range of "13≤key<25", it will be determined that the index key "20" will be inserted into the leaf index page 3.

However, as shown in FIG. 4A, the leaf index page 3 has stored four key values and thus is full. Therefore, an index split will be triggered.

FIG. 4B shows the index tree after the insertion of the index key "20". As shown in FIG. 4B, the leaf index page 3 in FIG. 4A is split into two leaf index pages 3-1 and 3-2. The previously stored index keys are split and stored into leaf index page 3-1 and leaf index page 3-2 respectively. Further, the new index key "20" is inserted into leaf index page 3-2.

In addition, in response to the index split, a new lowest key value "19" of the leaf index page 3-2 is generated. The non-leaf index page 1 in FIG. 4A may be updated as non-leaf index page 1' by adding a new index key "19", as shown in FIG. 4B.

By far, the insertion of the index key "20" is completed and the index tree is updated as shown in FIG. 4B.

The above case shows the split of the leaf index pages. Further, in some cases, in addition to the split of the leaf index pages, the non-leaf index page may also be split due to data insertion. For example, the index split of the leaf index pages may lead to a new lowest/highest index key, which should be added to the corresponding non-leaf index page. If the non-leaf index page is full, an index split of the non-leaf index page will be triggered.

In order to guarantee integrity of the index tree, before performing the index split operation, a synchronize I/O operation (force log write) on the index tree may be required. That is, the index tree will be written into the log before performing the index split operation. The synchronize I/O operation is time consuming. Therefore, if the index split operation occurs frequently due to data insertion, the efficiency of data insertion would be lowered.

Accordingly, there exists a need to provide a scheme for insert performance improvement, so as to increase the efficiency of data insertion.

In the insert performance improvement according to the present disclosure, a hot area in an index tree where an index split of the index tree has occurred due to a previous data insertion may be identified. The hot area may be used to predict boundary key values of new index pages to be inserted into the index tree for a next data insertion. Then, prior to the next data insertion, the new index pages may be inserted into the index tree based on the predicted boundary key values of the new index pages. Therefore, when performing the next data insertion, index split may be avoided and the incoming index keys may be stored in the reserved new index pages. Accordingly, the synchronize I/O operation may be reduced and the insert performance may be improved.

Figure 5:
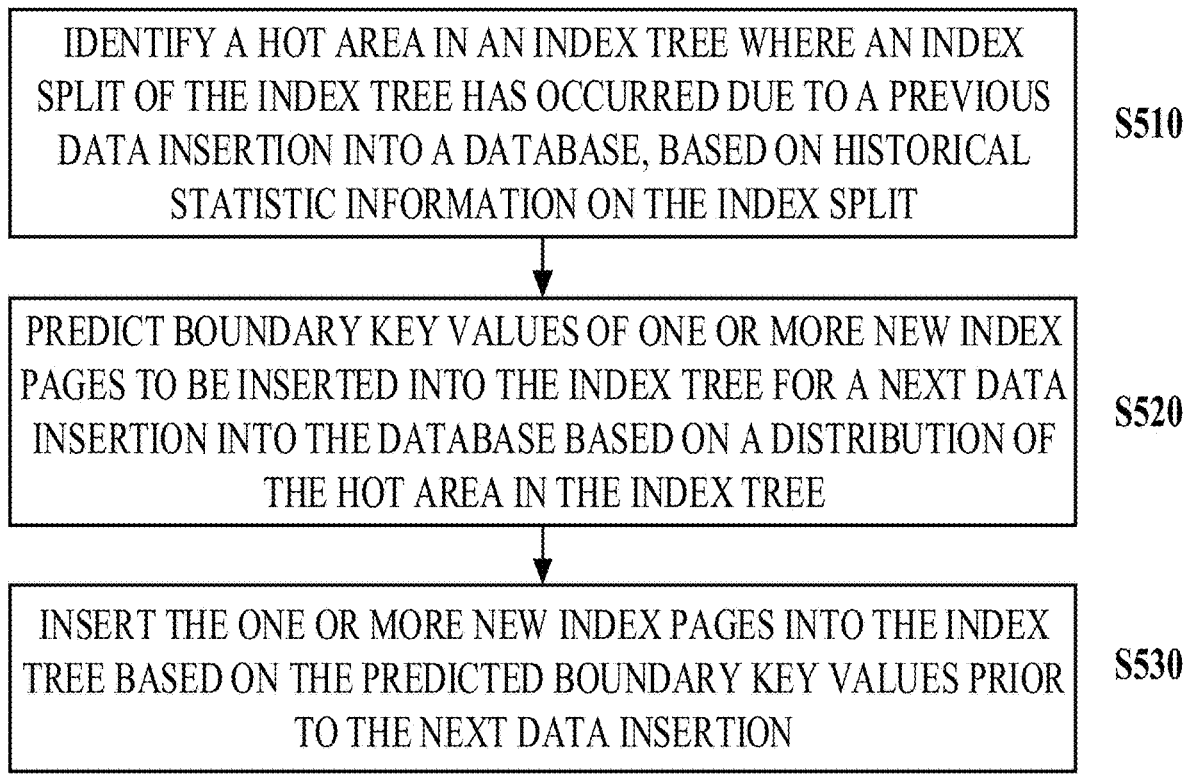
FIG. 5 depicts a flow chart showing an exemplary computer-implemented method for insert performance improvement according to an embodiment of the present disclosure.

Now refer to FIG. 5, which depicts a flow chart showing an exemplary computer-implemented method 500 for insert performance improvement according to an embodiment of the present disclosure.

In some embodiments, in step S510, a hot area in an index tree may be identified. The hot area is an area in the index tree where an index split of the index tree has occurred due to a previous data insertion into a database. Further, the hot area may be identified based on historical statistic information on the index split.

In some embodiments, the hot area may include one or more index pages in the index tree. For example, as shown in FIG. 4, due to the insertion of index key "20" associated with a piece of data insertion, the leaf index page 3 is split into leaf index pages 3-1 and 3-2. Therefore, the hot area may include the leaf index pages 3-1 and 3-2. Further, if one or more non-leaf index pages are split due to a data insertion, the non-leaf index pages may also be included in the hot area.

In some embodiments, the historical statistic information on the index split may include indicators of the split index pages due to a previous data insertion. The hot area may be identified based on the indicators of the split index pages due to a previous data insertion. For example, as shown in FIG. 4, since the split index pages are the leaf index pages 3-1 and 3-2, the hot area may be identified as including the leaf index pages 3-1 and 3-2.

In some embodiments, during the index split of the index tree due to data insertion, the historical statistic information on the index split (such as the indicators for split index pages) may be stored in an external table which is separate from the index tree. For example, when an index split occurs, the indicators of the split index pages (e.g., leaf index pages 3-1 and 3-2) may be recorded in the external table, and then the hot area may be identified by referring to the external table.

In some embodiments, the historical statistic information on the index split may include split key values of the index split of the index tree. For example, as shown in FIG. 4, due to the insertion of the index key "20", the leaf index page 3 is split into leaf index pages 3-1 and 3-2, and the index values "16" and "19", which are split from leaf index page 3 into leaf index pages 3-1 and 3-2 respectively, are the split index key values and may indicate the split position in the index tree. According to the split index values "16" and "19", the hot area may be identified as including the index pages which are associated with the split index values, e.g., the leaf index pages 3-1 and 3-2.

In some embodiments, the historical statistic information on the index split may include the key value ranges of the split leaf index pages (such as the leaf index pages 3-1 and 3-2 shown in FIG. 4B). The key value range may include the lowest index key value and the highest index key value stored in the leaf/non-leaf index page. For example, the key value range of the leaf index page 3-1 may be [13, 16], and the key value range of the leaf index page 3-2 may be [19, 22]. By using the key value ranges, the position of the split leaf index pages in the index tree may be identified.

It should be noted that the above-mentioned types of historical statistical information are examples, and other historical statistical information on the index split may also be applied to identify the hot area where an index split of the index tree has occurred due to a previous data insertion.

It is noted that the identified hot areas may present different insert patterns for different data insertion phases. For example, during a batch workload data insertion phase where a great quantity of data in the same category is inserted into the database within a certain period, the insert pattern may present a linear trend (either ascending or descending), since the data is inserted regularly. In contrast, during an online transaction phase in which data insertion occurs randomly and concurrently, the insert pattern may be random.

Figure 6A:
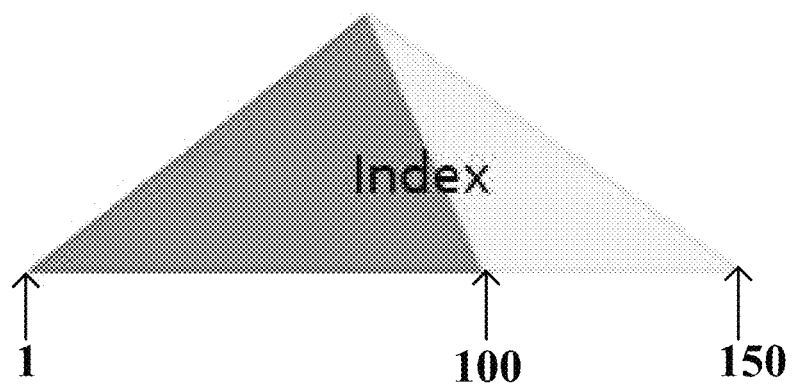
FIGS. 6A and 6B depicts exemplary linear insert patterns according to an embodiment of the present disclosure.
Figure 6B:
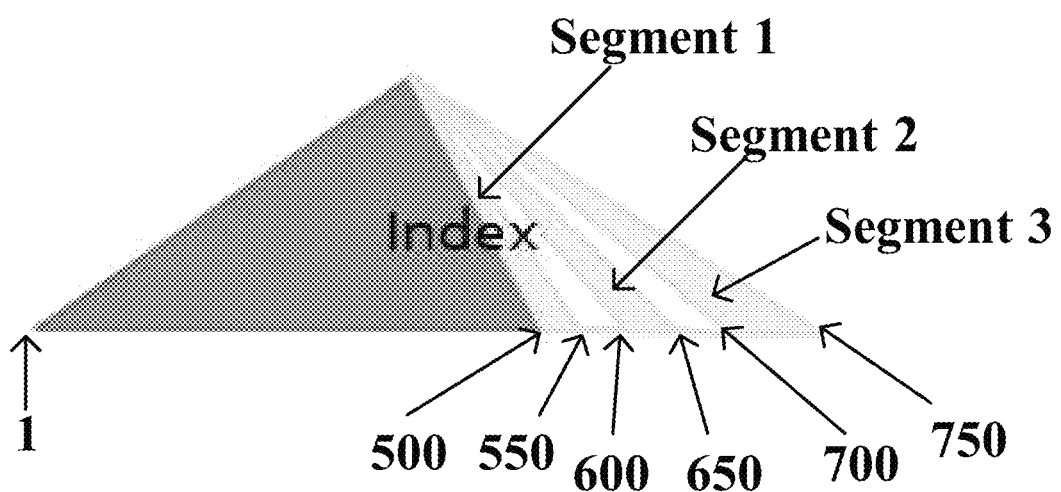

With reference to FIGS. 6A and 6B, exemplary linear insert patterns of hot areas according to an embodiment of the present disclosure will be described first.

As shown in FIG. 6, the index trees in FIG. 6A and FIG. 6B are shown as triangles, wherein the top vertex in each index tree indicates the root index page, the bottom edge indicates a plurality of leaf index pages, and the non-leaf index pages are located within the triangles. The detailed connecting relations of root index page, non-leaf index pages and leaf index pages are omitted in FIGS. 6A and 6B. In addition, the areas in dark gray in the index trees indicate the non-hot areas (i.e., the areas where an index split has not occurred due to a previous data insertion) and the areas in light gray in the index trees indicate the hot areas in the index trees identified in step S510.

As shown in FIG. 6A, the hot area is appended to the right of the non-hot area and presents a continuous form. This pattern is recited herein as a continuous linear insert pattern.

For example, the index tree shown in FIG. 6A may be associated with a student database for basic information registration for students in a college, each index key in the leaf index pages of the index tree may be associated with a piece of basic information of a student. The basic information may include name, contact information, age, address, and ID. In the non-hot area in dark gray shown in FIG. 6A, the index keys from "1" (the lowest key value) to "100" (the highest key value) are associated with the basic information for 100 students, which may have been inserted into the student database previously. The association between the index keys in the index tree and the basic information for the 100 students are shown in the following table 1.

TABLE 1

| Index Key | Basic Information |
|---|---|
| 1 | Name_1, Contact Info_1, Age_1, Address_1, ID_1 |
| 2 | Name_2, Contact Info_2, Age_2, Address_2, ID_2 |
| ... | ... |
| 100 | Name_100, Contact Info_100, Age_100, Address_100, ID_100 |

Assuming that there are 50 new students entering the college during a new school year, and the basic information of these students need to be registered into the student database. The association between the index keys in the index tree and the basic information for the new 50 students are shown in the following table 2, wherein the index keys are numbered in sequence following the index key "100".

TABLE 2

| Index Key | Basic Information |
|---|---|
| 101 | Name_101, Contact Info_101, Age_101, Address_101, ID_101 |
| 102 | Name_102, Contact Info_102, Age_102, Address_102, ID_102 |
| ... | ... |
| 150 | Name_150, Contact Info_150, Age_150, Address_150, ID_150 |

Assuming that the data insertion for the new 50 students are performed within 5 days during a batch workload data insertion phase, wherein for each day, basic information of ten students is to be inserted sequentially. For day 1, index keys 101-110 are inserted, and index split of the index tree may occur. The split index pages may be appended to the right of the non-hot area. For day 2, index keys 111-120 are inserted, and index split of the index tree may further occur. The split index pages may be appended to the right of the index pages related to index keys 101-110. For the next three days, similar data insertion may be performed, and the split index pages may be further appended to the right of the previously split index pages in a linear trend. Accordingly, the hot area shown in FIG. 6A will be generated, wherein the new highest index key of the leaf index pages becomes "150". Similarly, the split non-leaf index pages will be appended to the right of the previous non-leaf index pages. These split leaf index pages may be identified as the hot area based on historical statistic information on the index split, for example, the key value ranges of the split leaf index pages from 101 to 150.

FIG. 6B illustrate another linear insert pattern of the hot area, wherein the hot area is appended to the right of the non-hot area and is segmented into a plurality of segments, and there are no index keys inserted in the rest portions in the hot area. This pattern is recited herein as a segmented linear insert pattern.

For example, the index tree shown in FIG. 6B may be associated with another student database for basic information registration for students in a college. Different from the student database described with reference to FIG. 6A, in the student database related to FIG. 6B, each index key is associated with an item in the basic information. For example, as shown in the following table 3, index keys 1-100 correspond to the names of students 1-100 respectively, index keys 101-200 correspond to the contact information of students 1-100 respectively, index keys 201-300 correspond to the ages of students 1-100 respectively, index keys 301-400 correspond to the addresses of students 1-100 respectively, and index keys 401-500 correspond to the IDs of students 1-100 respectively.

TABLE 3

| Index Key | Name | Index Key | Contact Info | Index Key | Age | Index Key | Address | Index Key | ID |
|---|---|---|---|---|---|---|---|---|---|
| 1 | Name_1 | 101 | Contact Info_1 | 201 | Age_1 | 301 | Address_1 | 401 | ID_1 |
| 2 | Name_2 | 102 | Contact Info_2 | 202 | Age_2 | 302 | Address_2 | 402 | ID_2 |
| ... | ... | ... | ... | ... | ... | ... | ... | ... | ... |
| 100 | Name_100 | 200 | Contact Info_100 | 300 | Age_100 | 400 | Address_100 | 500 | ID_100 |

Assuming that there are 50 new students entering the college during a new school year, and the basic information of these students need to be registered into the student database. Further, during the current stage, only the items "name", "age", and "ID" need to be registered, and the rest two items "contact information" and "address" may be registered later. The association between the index keys in the index tree and the basic information for the new 50 students are shown in the following table 4, wherein the index keys are segmented into three segments 501-550, 601-650 and 701-750 and not continuous.

TABLE 4

| Index Key | Name | Index Key | Age | Index Key | ID |
|---|---|---|---|---|---|
| 501 | Name_101 | 601 | Age_101 | 701 | ID_101 |
| 502 | Name_102 | 602 | Age_102 | 702 | ID_102 |
| ... | ... | ... | ... | ... | ... |
| 550 | Name_150 | 650 | Age_150 | 750 | ID_150 |

In this scenario, as shown in FIG. 6B, the hot area is segmented into three separate segments 1, 2, 3 corresponding to the segments shown in table 4, since the inserted index keys are not continuous. However, for each segment, the hot area still presents a linear trend.

For example, assuming that the data insertion for the new 50 students are performed within 5 days during a batch workload data insertion phase, wherein for each day, basic information of ten students is to be inserted sequentially. For day 1, index keys 501-510, 601-610, 701-710 are inserted, and index split of the index tree may occur. For each segment, the split index pages may be appended to the right of the non-hot area. For day 2, index keys 511-520, 611-620, 711-720 are inserted, and index split of the index tree may further occur. For each segment, the split index pages may be appended to the right of the index pages in the same segment. For the next three days, similar data insertion may be performed, and the split index pages may be further appended to the right of the previously split index pages in a linear trend in each segment.

Although FIGS. 6A and 6B shows exemplary hot areas which are appended to the right of the non-hot areas, in some scenarios, the hot areas may be identified as to be appended to the left of the non-hot areas. Further, in some scenarios, the hot area may be inserted within the non-hot area.

It is considered that the hot area may indicate a statistical feature of the index split due to data insertion, especially when a batch workload data insertion is performed. For example, in the scenario shown in FIG. 6A, the hot area corresponds to the insertion of basic information of 50 new students. Assuming that there are 50 more new students for which basic information need to be stored. In this case, since the hot area is appended to the right of the non-hot area, it is likely that the next index split will occur with similar trend as the existing hot area, e.g., further appended to the right of the current hot area. The hot area with a segment linear insert pattern may similarly indicate a statistical feature of the index split due to data insertion. Therefore, by identifying the hot area, a next index split may be predicted. The prediction is described in detail in step S520 of FIG. 5.

Referring back to FIG. 5, in some embodiments, in step S520, boundary key values of one or more new index pages to be inserted into the index tree for a next data insertion into the database is predicted based on a distribution of the hot area.

The boundary key values of a new index page may include the lowest index key value and the highest index key value of the new index page, and may be used to determine the exact position in the index tree where the new index page is to be inserted.

In some embodiments, the distribution of the hot area in the index tree may include boundary key values of the one or more index pages included in the hot area. The boundary key values may determine the position of the hot area in the index tree. For example, as shown in FIG. 6A, the boundary key values of the hot area are the lowest key value "101" and the highest key value "150". Therefore, the boundary key values of the new index page to be inserted into the index tree may be determined as a lowest key value "151" and a highest key value "200". The new index page may be appended to the right of the hot area.

In some embodiments, the distribution of the hot area in the index tree may further include the number of key values added into the hot area during the previous data insertion. The number of key values added into the hot area may determine the size of the index page. For example, as shown in FIG. 6A, the number of key values added into the hot area is 50. Therefore, the size of the new index page may be determined as at least capable of storing 50 key values. In addition, if the fixed size for one index page is less than the determined size, more than one index page may be split based on the required size.

In some embodiments, the prediction may be performed based on a machine learning algorithm. For example, regression analysis such as linear regression may be used in the machine learning model to predict a trend of the key values so as to predict the boundary key values of the new index page. Specifically, a machine learning model may be built. For a plurality of time periods such as a plurality of days, historical statistic information within each period may be collected. An input to the model may be index key values related to data insertions in day 1 to day N−1, and the output of the model may be the predicted boundary key values of the new index page for day N.

In some embodiments, the hot area may not be continuous and may include a plurality of segmented hot areas, as shown in FIG. 6B. In this case, the statistical characteristics of the plurality of segmented hot areas may differ. Therefore, each segmented hot area may be considered separately, so as to provide a prediction with more accuracy.

Specifically, in some embodiments, the hot area may be clustered into a plurality of segments, wherein each segment may include one or more index pages. For each clustered segment, boundary key values of one or more new index pages may be predicted based on a distribution of the clustered segment in the index tree. The prediction based on the distribution of each clustered segment may be similarly performed as the prediction based on the distribution of the whole hot area described above. For example, a machine learning model may be built for each clustered segment.

Referring back to FIG. 5, in step S530, the one or more new index pages are inserted into the index tree based on the predicted boundary key values in step S520 prior to the next data insertion. The boundary key values predicted in step S520 may be used to determine the exact insert position of the new index pages and thus may facilitate insertion of the new index pages.

Based on the method 500, one or more new index pages may be reserved within the index tree prior to the next data insertion. Therefore, when performing the next data insertion, index split may be avoided and the incoming index keys may be stored in the reserved new index pages. Accordingly, the insert performance may be improved.

In some embodiments, multiple index pages may be reserved based on the prediction in step S520. Therefore, only one synchronize I/O operation (force log write) on the index tree is required, and thus the insert efficiency may be increased.

The method 500 according to the present disclosure may be applicable to the batch workload insertion phase where a great quantity of data in the same category is inserted into the database within a certain time period, because the batch workload usually presents a linear trend (either ascending or descending). The linear trend of the batch workload insertion may lead to a linear insert pattern of the hot area, including the above-described continuous linear insert pattern and segmented linear insert pattern, which may indicate a statistical feature of the batch workload data insertion. By predicting and reserving new index pages based on the hot area, the insert performance may be improved.

As mentioned above, in addition to the linear insert pattern, there is a random insert pattern which may usually occur during online transaction phase in which data insertion occurs randomly and concurrently. In some cases, the prediction and reservation of new index pages may be inaccurate under the random insert pattern, because the statistical feature of the random insert pattern may not be easily obtained. Therefore, it may be advantageous to identify the insert pattern of the hot area before performing the prediction and reservation in method 500.

In some embodiments, in order to identify the insert pattern of the hot area, a tendency of index key value increasement in a non-leaf index page of the index tree related to the hot area may be determined. Further, the insert pattern may be identified based on the determined tendency.

For example, the following table 5 shows index key values in a non-leaf index page related to the hot area, wherein "369", "419", and "682" are newly generated index keys due to index split. The tendency of index key value increasement in the non-leaf index page may be determined as in ascending order. Therefore, the insert pattern may be identified as a linear ascending insert pattern.

TABLE 5

| 23 | 89 | 145 | 212 | 269 | 321 | 369 | 419 | 682 |

Generally, it may not be easy to judge an insert pattern from the viewpoint of leaf index pages, since the new index key may not come in sequence, and thus the general trend cannot be easily grasped if the index key values of the leaf index pages are monitored. However, the general trend of index key insertion may be indicated by the index key value increasement in the non-leaf index pages related to the hot area. Therefore, it would be easy to identify the insert pattern of the hot area.

In some embodiments, since the prediction in step S520 may be more accurate in the case of linear insert pattern (e.g., batch workload phase), the insertion process in step S530 may be perform only in the case where it is identified that the insert pattern is the linear insert pattern.

Under a random insert pattern, although the insertion trend may not be easily predicted, it is considered that the index pages which are used frequently may be split with more possibility and may be split even more than once. In the present disclosure, the meaning of an index page being used is that the content of the index page changes, for example, one or more index keys is inserted into this index page during a data insertion, or this index page split into multiple pages, or this index page is newly generated by an index split.

Therefore, in some embodiments, in response to a split requirement in a frequently used index page, instead of splitting this index page into two pages, at least three index pages are split from the frequently used index page for one time. Therefore, the split efficiency will be improved. In addition, the synchronous I/O times of force log write will be decreased because multiple potential index page splits have been combined to only one split.

In some embodiments, the number of index pages split from the index page may be determined based on a usage frequency of the index page of the index tree. As a general principle, the more frequently the index page is used, the more index pages are to be split from the index page.

In some embodiments, a first-in first-out queue may be used to indicate the usage frequency of each index page in the index tree, wherein an indicator corresponding to a latest used index page may be stored at the front of the queue and an indicator corresponding to a least recently used index page may be stored at the rear of the queue. Further, the queue may be used to determine the number of index pages to be split. For example, it may be determined in advance that the index pages indicated by the queue will be split into a predetermined number of index pages, for example, three index pages, four index pages, five index pages, etc. The embodiment of index page split by using the first-in first-out queue will be described in detail with reference to FIGS. 7A, 7B, 7C and 8.

Figure 7A:
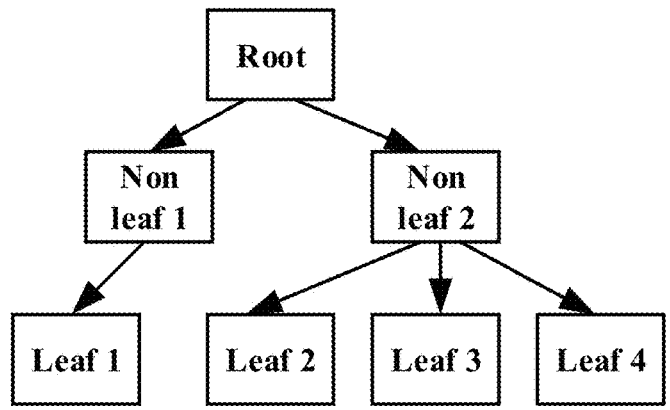
FIGS. 7A, 7B and 7C depicts exemplary index tree structures during index insertions according to an embodiment of the present disclosure.
Figure 7B:
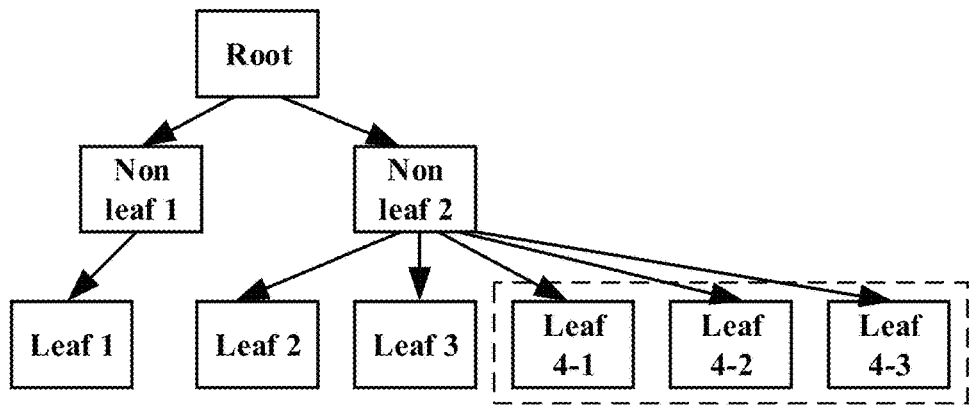
Figure 7C:
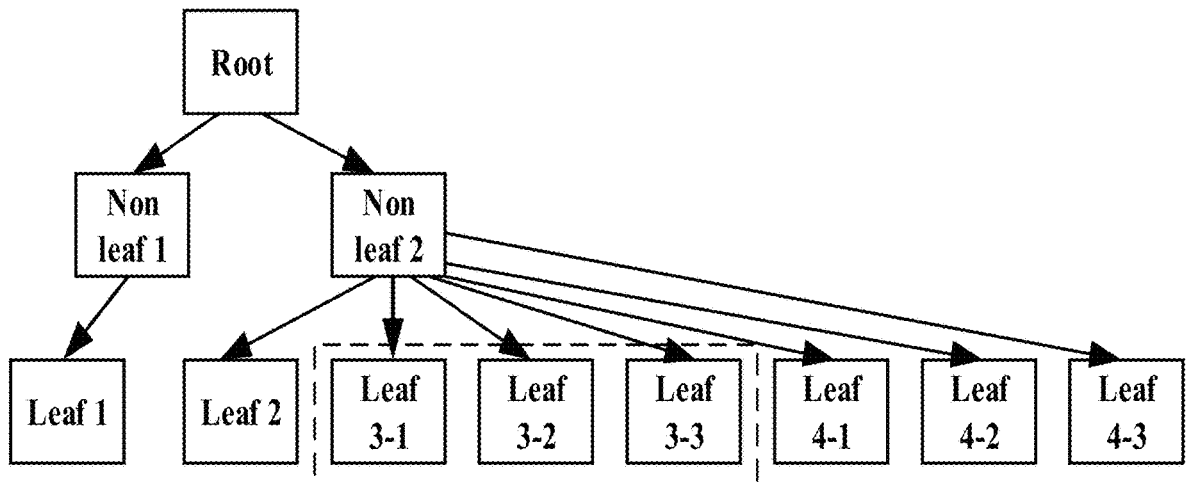
Figure 8:
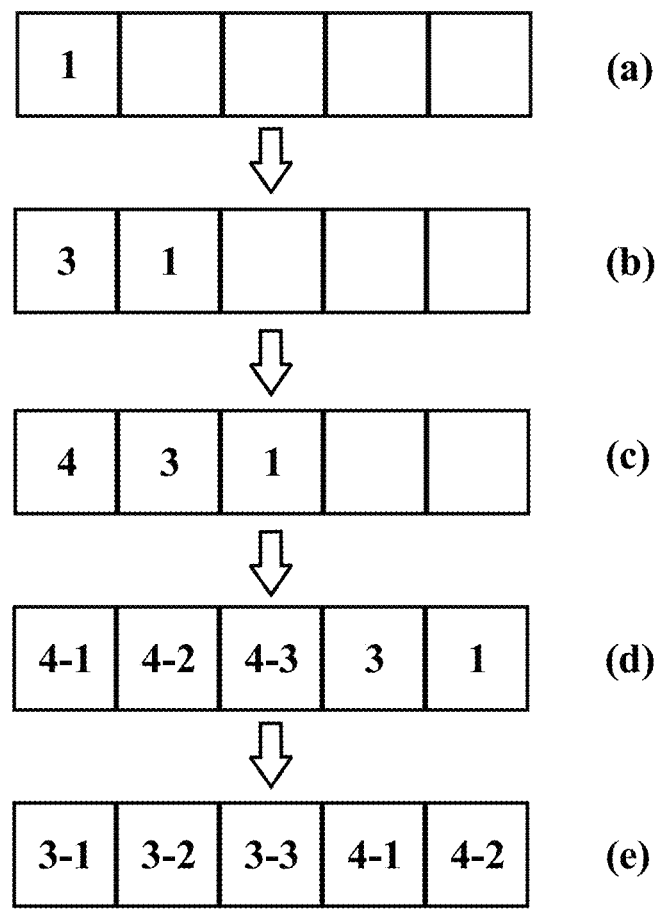
FIG. 8 depicts states of a candidate queue indicating the frequently used index pages during the index insertions of FIGS. 7A, 7B and 7C according to an embodiment of the present disclosure.

FIGS. 7A, 7B and 7C depicts exemplary index tree structures during index insertions according to an embodiment of the present disclosure, and FIG. 8 depicts states of a candidate queue indicating the frequently used index pages during the index insertions of FIGS. 7A, 7B and 7C, according to an embodiment of the present disclosure. It is predetermined that the index pages recorded in the candidate queue will be split into three index pages if a split is triggered.

As shown in FIG. 7A, the initial index tree includes a root index page, two non-leaf index pages 1 and 2, and four leaf index pages 1-4.

For a first index insertion, assuming that an index key is inserted into the leaf index page 1, which means that the leaf index page 1 is used during this insertion. Therefore, as shown in FIG. 8(a), "1" indicating the leaf index page 1 is recorded in the candidate queue.

For a second index insertion, assuming that an index key is inserted into the leaf index page 3, which means that the leaf index page 3 is used during this insertion. Therefore, as shown in FIG. 8(b), "3" indicating the leaf index page 3 is recorded in the candidate queue. Further, since the leaf index page 3 is the most recently used, "3" indicating the leaf index page 3 is recorded at the front of the candidate queue, and "1" is moved after "3".

For a third index insertion, assuming that an index key is inserted into the leaf index page 4, which means that the leaf index page 4 is used during this insertion. Therefore, as shown in FIG. 8(b), "4" indicating the leaf index page 4 is recorded in the candidate queue. Further, since the leaf index page 4 is the most recently used, "4" indicating the leaf index page 4 is recorded at the front of the candidate queue, and "3" and "1" are moved accordingly.

For a fourth index insertion, assuming that an index key is inserted into the leaf index to determine the number of index pages split from the leaf index page 4, the current candidate queue shown in FIG. 8(c) will be referred. Since "4" indicating the leaf index page 4 is recorded in the candidate queue, the leaf index page 4 will be split into three leaf index pages 4-1, 4-2 and 4-3, as shown in FIG. 7B. Further, the candidate queue is updated by recording the indicators of the split leaf index pages 4-1, 4-2 and 4-3 in the front of the queue and moving "3" and "1" backward accordingly. The updated candidate queue is shown in FIG. 8(d).

For a fifth index insertion, assuming that an index key is inserted into the leaf index page 3 again and a split requirement for the leaf index page 3 is triggered because the leaf index page 3 is full, an index split for the leaf index page 3 will occur. Similar as the split for leaf index page 4, the leaf index page 3 will be split into three leaf index pages (see FIG. 7C) because "3" is recorded in the current candidate queue shown in FIG. 8(d). Further, the candidate queue is updated by recording the split leaf index pages 3-1, 3-2 and 3-3 in the front of the queue and moving "4-1", "4-2", "4-3", "3" and "1" backward accordingly. Due to the size of the candidate queue, the last "3" and "1" will be moved out from the candidate queue. The updated candidate queue is shown in FIG. 8(e).

It is noted that the size of the candidate queue may be set according to actual requirements. The larger the size, the more frequently used index pages the candidate queue may indicate. Further, the number of index pages to be split may be predetermined. It is predetermined that each index page indicated by the candidate queue in FIG. 8 may be split into three index pages. However, the number of split index pages may be set as a different value, such as four index pages, five index pages, etc. Further, for a candidate queue, different stages may be set, and for index pages corresponding to different stages in the candidate queue, different numbers of split index pages may be determined.

According to the processes described with reference to FIGS. 7A, 7B, 7C and 8, by referring to the queue, the most frequently used index pages may be determined to split into more than two index pages for one time. Therefore, the split efficiency will be improved. In addition, the synchronous I/O times of force log write will be decreased because multiple potential index page splits have been combined to only one split.

In some embodiments, after determining the number of the index pages to be split, the index split will occur. In some embodiments, the index page may be uniformly split into the determined number of index pages.

Figure 9A:
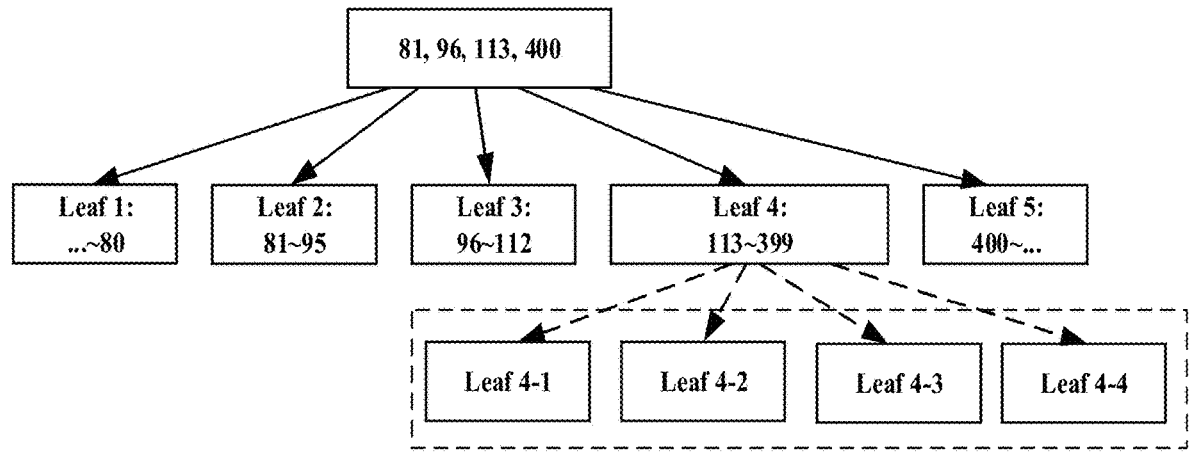
FIGS. 9A and 9B depicts an exemplary uniform split according to an embodiment of the present disclosure.
Figure 9B:
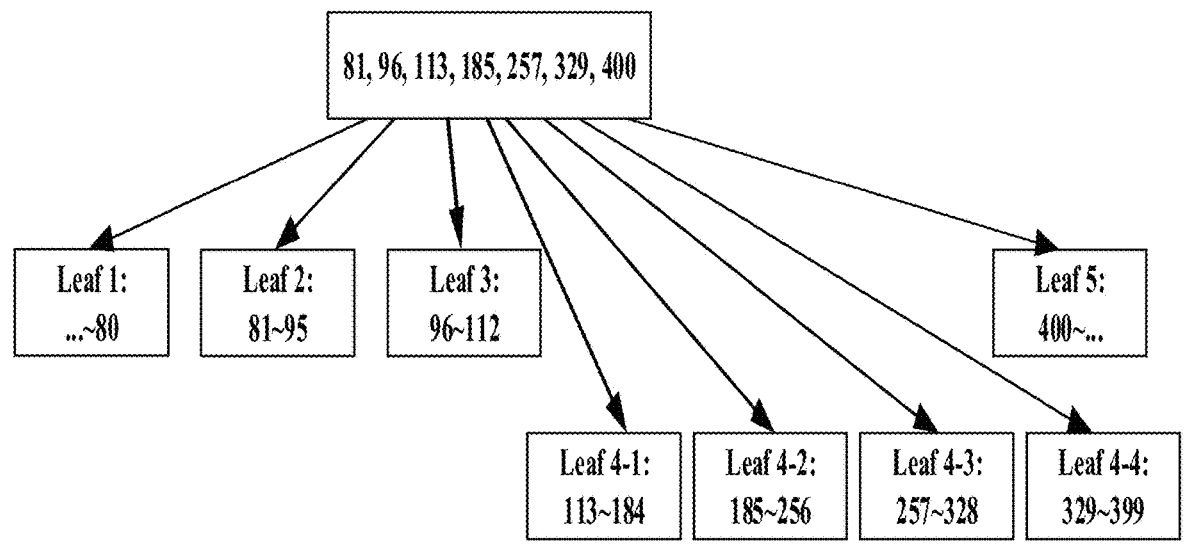

FIGS. 9A and 9B depicts an exemplary uniform split according to an embodiment of the present disclosure. FIG. 9A shows the index tree before index split which includes a non-leaf index page with four index keys "81", "96", "113" and "400" and five leaf index pages. The four index keys "81", "96", "113" and "400" correspond to the lowest key values of respective leaf index pages 2-5, while the lowest key value of the leaf index page 1 is unlimited and is omitted in the non-leaf page. FIG. 9B shows the index tree after index split. Assuming that in FIG. 9A, the leaf index page 4 is to be split into four leaf index pages 4-1, 4-2, 4-3 and 4-4.

In some embodiments, a key range of the index page before split, i.e., the leaf index page 4, is calculated first. According to the key values stored in the non-leaf index page in FIG. 9A, the key range of the leaf index page 4 before split may be 400−113=287. Further, the key range may be uniformly distributed to the four split index pages, i.e., the key range for each split index page of leaf index pages 4-1, 4-2, 4-3, and 4-4 will be 287/4=72 (rounded).

Then, the boundary key values for each split index page may be determined based on the uniformly calculated key range. For leaf index page 4-1, the lowest key value will be remained as "113". For leaf index page 4-2, the lowest key value will be 113+72=185. Similarly, for leaf index page 4-3, the lowest key value will be 185+72=257. For leaf index page 4-4, the lowest key value will be 257+72=329. Therefore, the boundary key values for the four leaf index pages 4-1, 4-2, 4-3 and 4-4 are determined as "113~184", "185~256", "257~328" and "329~399" respectively. Further, the lowest key values "185", "257" and "329" will be determined as the key values stored in the parent non-leaf index page of the four split leaf index pages, as shown in FIG. 9B.

By uniformly split the index page into a plurality of index pages, the space in each split index page will be more uniform, and the possibility of a further index split will be lowered. Therefore, the efficiency of data insertion will be improved.

It should be noted that the processing of insert performance improvement according to embodiments of this disclosure could be implemented by computer system/server 12 of FIG. 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a hot area in an index tree where an index split of the index tree has occurred due to a previous data insertion into a database based on historical statistic information on the index split;
   predicting boundary key values of one or more new index pages to be inserted into the index tree for a next data insertion into the database based on a distribution of the hot area in the index tree; and
   inserting the one or more new index pages into the index tree based on the predicted boundary key values prior to the next data insertion.

2. The computer-implemented method according to claim 1, wherein
   the hot area includes one or more index pages in the index tree, wherein the distribution of the hot area includes boundary key values of the one or more index pages included in the hot area and number of key values added into the hot area during the previous data insertion.

3. The computer-implemented method according to claim 1, wherein
   predicting the boundary key values of the one or more new index pages further comprises:
   clustering the hot area into a plurality of segments; and
   for each clustered segment, predicting boundary key values of one or more new index page based on a distribution of the clustered segment in the index tree.

4. The computer-implemented method according to claim 1, further comprising:
   identifying an insert pattern of the hot area, wherein the insert pattern includes a linear insert pattern and a random insert pattern,
   wherein the one or more new index pages are inserted into the index tree based on the predicted boundary key values prior to the next data insertion in a case where it is identified that the insert pattern is the linear insert pattern.

5. The computer-implemented method according to claim 4, wherein
   identifying the insert pattern based on the historical statistic information comprises:
   determining a tendency of index key value increasement in a non-leaf index page of the index tree related to the hot area; and
   identifying the insert pattern based on the determined tendency.

6. The computer-implemented method according to claim 4, further comprising:
   where it is identified that the insert pattern is the random insert pattern, in response to an index split requirement in an index page of the index tree, splitting the index page into at least three index pages,
   wherein a number of index pages split from the index page is determined based on a usage frequency of the index page of the index tree.

7. The computer-implemented method according to claim 6, wherein
   the usage frequencies of respective index pages in the index tree are indicated using a first-in first-out queue,
   wherein an indicator corresponding to a latest used index page is stored at a front of the first-in first-out queue and an indicator corresponding to a least used index page is stored at a rear of the first-in first-out queue.

8. The computer-implemented method according to claim 6, wherein
   the at least three index pages are uniformly split from the index page before the index split.

9. A computer system, the computer system comprising:
   one or more computer processors, one or more computer-readable storage media, and program instructions stored on the one or more of the computer-readable storage media for execution by at least one of the one or more processors, wherein the computer system is capable of performing a method comprising:
   identifying a hot area in an index tree where an index split of the index tree has occurred due to a previous data insertion into a database based on historical statistic information on the index split;
   predicting boundary key values of one or more new index pages to be inserted into the index tree for a next data insertion into the database based on a distribution of the hot area in the index tree; and
   inserting the one or more new index pages into the index tree based on the predicted boundary key values prior to the next data insertion.

10. The computer system according to claim 9, wherein
    predicting the boundary key values of the one or more new index pages further comprises:
    clustering the hot area into a plurality of segments; and
    for each clustered segment, predicting boundary key values of one or more new index page based on a distribution of the clustered segment in the index tree.

11. The computer system according to claim 9, further comprising:

identifying an insert pattern of the hot area based on the historical statistic information, wherein the insert pattern includes a linear insert pattern and a random insert pattern, wherein the one or more new index pages are inserted into the index tree based on the predicted boundary key values prior to the next data insertion in a case where it is identified that the insert pattern is the linear insert pattern.

12. The computer system according to claim 11, wherein identifying the insert pattern based on the historical statistic information comprises:

determining a tendency of index key value increasement in a non-leaf index page of the index tree related to the hot area; and identifying the insert pattern based on the determined tendency.

13. The computer system according to claim 11, further comprising:

where it is identified that the insert pattern is the random insert pattern, in response to a split requirement in an index page of the index tree, splitting the index page into at least three index pages, wherein a number of index pages split from the index page is determined based on a usage frequency of the index page of the index tree.

14. The computer system according to claim 13, wherein the usage frequencies of respective index pages in the index tree are indicated using a first-in first-out queue, wherein an indicator corresponding to a latest used index page is stored at a front of the first-in first-out queue and an indicator corresponding to a least used index page is stored at a rear of the first-in first-out queue.

15. A computer program product, the computer program product comprising:

one or more computer-readable storage media and program instructions stored on the one or more computer-readable storage media, the program instructions executable by a computing system to cause the computing system to perform a method comprising:

identifying a hot area in an index tree where an index split of the index tree has occurred due to a previous data insertion into a database based on historical statistic information on the index split;

predicting boundary key values of one or more new index pages to be inserted into the index tree for a next data insertion into the database based on a distribution of the hot area in the index tree; and inserting the one or more new index pages into the index tree based on the predicted boundary key values prior to the next data insertion.

16. The computer program product of claim 15, wherein predicting the boundary key values of the one or more new index pages further comprises:

clustering the hot area into a plurality of segments; and for each clustered segment, predicting boundary key values of one or more new index page based on a distribution of the clustered segment in the index tree.

17. The computer program product of claim 15, further comprising:

identifying an insert pattern of the hot area based on the historical statistic information, wherein the insert pattern includes a linear insert pattern and a random insert pattern, wherein the one or more new index pages are inserted into the index tree based on the predicted boundary key values prior to the next data insertion in a case where it is identified that the insert pattern is the linear insert pattern.

18. The computer program product of claim 17, wherein identifying the insert pattern based on the historical statistic information comprises:

determining a tendency of index key value increasement in a non-leaf index page of the index tree related to the hot area; and identifying the insert pattern based on the determined tendency.

19. The computer program product of claim 17, further comprising:

where it is identified that the insert pattern is the random insert pattern, in response to a split requirement in an index page of the index tree, splitting the index page into at least three index pages, wherein a number of index pages split from the index page is determined based on a usage frequency of the index page of the index tree.

20. The computer program product of claim 19, wherein the usage frequencies of respective index pages in the index tree are indicated using a first-in first-out queue, wherein an indicator corresponding to a latest used index page is stored at a front of the first-in first-out queue and an indicator corresponding to a least used index page is stored at a rear of the first-in first-out queue.

* * * * *